United States Patent
Peressini et al.

(10) Patent No.: US 7,292,991 B2
(45) Date of Patent: Nov. 6, 2007

(54) DISAMBIGUATING POINT-OF-SALE DATA THROUGH ITEM INDEXING

(75) Inventors: Robert J. Peressini, Park City, UT (US); William D. Dunlavy, Park City, UT (US); Ronald S. Sorensen, Francis, UT (US)

(73) Assignee: Park City Group, Park City, UT (US)

( * ) Notice: Subject to any disclaimer, the term of this patent is extended or adjusted under 35 U.S.C. 154(b) by 355 days.

(21) Appl. No.: 10/434,795

(22) Filed: May 9, 2003

(65) Prior Publication Data

US 2004/0225568 A1    Nov. 11, 2004

(51) Int. Cl.
    *G06Q 15/00*    (2006.01)
(52) U.S. Cl. .................................................. 705/22
(58) Field of Classification Search ................ 705/10, 705/22, 26
    See application file for complete search history.

(56) References Cited

U.S. PATENT DOCUMENTS

| | | | | |
|---|---|---|---|---|
| 5,168,445 A | * | 12/1992 | Kawashima et al. | 705/10 |
| 5,299,115 A | * | 3/1994 | Fields et al. | 705/10 |
| 5,854,746 A | * | 12/1998 | Yamamoto et al. | 700/106 |
| 6,609,101 B1 | * | 8/2003 | Landvater | 705/10 |
| 2001/0049690 A1 | * | 12/2001 | McConnell et al. | 707/104.1 |
| 2002/0106432 A1 | * | 8/2002 | Yamagata et al. | 426/496 |
| 2004/0193478 A1 | * | 9/2004 | Miller et al. | 705/10 |

FOREIGN PATENT DOCUMENTS

JP    199120675    *    8/1992

OTHER PUBLICATIONS

Sanchez, M, Dismantling nuclear facilities, Journal: Nuclear Europe Worldscan, vol. 13, No. 1-2, p. 38.*

* cited by examiner

*Primary Examiner*—Florian Zeender
*Assistant Examiner*—Garcia Ade
(74) *Attorney, Agent, or Firm*—Kory D. Christensen; Stoel Rives LLP

(57) ABSTRACT

A point-of-sale interface receives point-of-sale quantities for a number of individual items, as well as point-of-sale quantity for a miscellaneous group item that includes undifferentiated sales of one or more of the individual items. An item indexer calculates an item index for each individual item comprising a fraction of the miscellaneous group item sales attributable to the individual item. A sales disambiguator computes a revised point-of-sale quantity for each individual item using the item index and the point-of-sale quantities for the miscellaneous group item and the individual item.

33 Claims, 9 Drawing Sheets

204 — [ 60 Cookies
        ⎡ 30 Chocolate Chip Cookies
  202 ⎨ 25 Peanut Butter Cookies   ← 104
        ⎨ 15 Oatmeal Cookies
        ⎨ 15 Sugar Cookies
        ⎣ 24 Snickerdoodles*

204 — [ 75 Doughnuts
202 — [ 25 Glazed Doughnuts

*Special Order

POS Interface (Scrubber) — 302

204 — [ 60 Cookies
        ⎡ 30 Chocolate Chip Cookies
  202 ⎨ 25 Peanut Butter Cookies   ← 304
        ⎨ 15 Oatmeal Cookies
        ⎣ 15 Sugar Cookies 204 — [ 75 Doughnuts
202 — [ 25 Glazed Doughnuts

Comparison of Disambiguated Sales vs. Estmated Sales Based on Proportionate Allocation

| Variety | POS Sales 202 | Estimated* | Disambiguated Sales 314 | %Δ |
|---|---|---|---|---|
| Chocolate Chip Cookies | 30 | 51 | 60 | +17% |
| Peanut Butter Cookies | 25 | 42 | 37 | −12% |
| Oatmeal Cookies | 15 | 26 | 33 | +27% |
| Sugar Cookies | 15 | 26 | 15 | −42% |

*Based on an allocation of sixty micellaneous group item sales in proportion to to the individual item sales

FIG. 8

DISAMBIGUATING POINT-OF-SALE DATA THROUGH ITEM INDEXING

TECHNICAL FIELD

The present invention relates generally to the fields of demand forecasting and production planning. More specifically, the present invention relates to techniques for increasing forecast accuracy by disambiguating point-of-sale data.

BACKGROUND OF THE INVENTION

Demand forecasting is an essential component of production planning. Nowhere is this statement more true than in the perishable food industry. Bakeries, delis, doughnut shops, supermarkets, and the like, must accurately predict customer demand in order to produce the right amount of goods to be sold each day. Forecasts that are too high typically result in wasted goods. Forecasts that are too low often result in lost sales and customer annoyance.

Various software programs, such as Fresh Market Manager™ (FMM), available from Park City Group, Inc., have addressed the need for demand forecasting. The FMM forecasting engine predicts how many of a given item is required each day based on historical point-of-sale data, adjusted for influences such as holidays, weather, seasons, and competitor activity.

Unfortunately, the forecasts produced by these software programs are only as accurate as the data provided to them. One difficulty in obtaining accurate data is due to the fact that the sale of certain items can be recorded in different ways by a point-of-sale device (e.g., cash register). For example, certain individual items, such as chocolate chip cookies, can be "rung up" as miscellaneous or variety items, e.g., "cookies" or "miscellaneous bakery." However, the forecasting engine does not need to forecast how many miscellaneous bakery items are needed in a given day. Rather, it must determine how many chocolate chip cookies will be required to satisfy customer demand.

Point-of-sale data that include both individual item sales and undifferentiated, miscellaneous or variety item sales are ambiguous and typically result in inaccurate forecasts. Accordingly, a need exists for a technique for disambiguating point-of-sale data to enhance forecasting accuracy.

SUMMARY OF THE INVENTION

A point-of-sale interface receives sales quantities for a number of individual items from a point-of-sale feed. The point-of-sale interface also receives sales quantities for a miscellaneous group item that includes undifferentiated sales of one or more of the individual items. Optionally, the point-of-sale interface excludes sales marked as special orders from the sales quantities.

An item indexer calculates an item index for each individual item comprising a fraction of the miscellaneous group item sales attributable to the individual item. In one embodiment, the item index is calculated by determining a quantity of the individual item produced but not accounted for in the sales for the individual item and any non-point-of-sale transfers (e.g., invoice orders, shrink/waste), and dividing the quantity of the individual item produced but not accounted for by a sum of all of the individual items produced but not accounted for in the sales for the individual items and any non-point-of-sale transfers.

A sales disambiguator computes a revised sales quantity for each individual item using the item index and the sales for the miscellaneous group item and the individual item. In one embodiment, the revised sales quantity is calculated by adding the original sales quantity for the individual item to a product of the item index for the individual item and the point-of-sale quantity for the miscellaneous group item.

The sales disambiguator provides the revised sales quantities for the individual items to a forecasting system, resulting in a more accurate forecast than can be had by relying on the original sales quantities.

BRIEF DESCRIPTION OF THE DRAWINGS

FIG. 8 is a table comparing disambiguated sales quantities with estimated quantities using a conventional approach.

DETAILED DESCRIPTION

Figure 1:
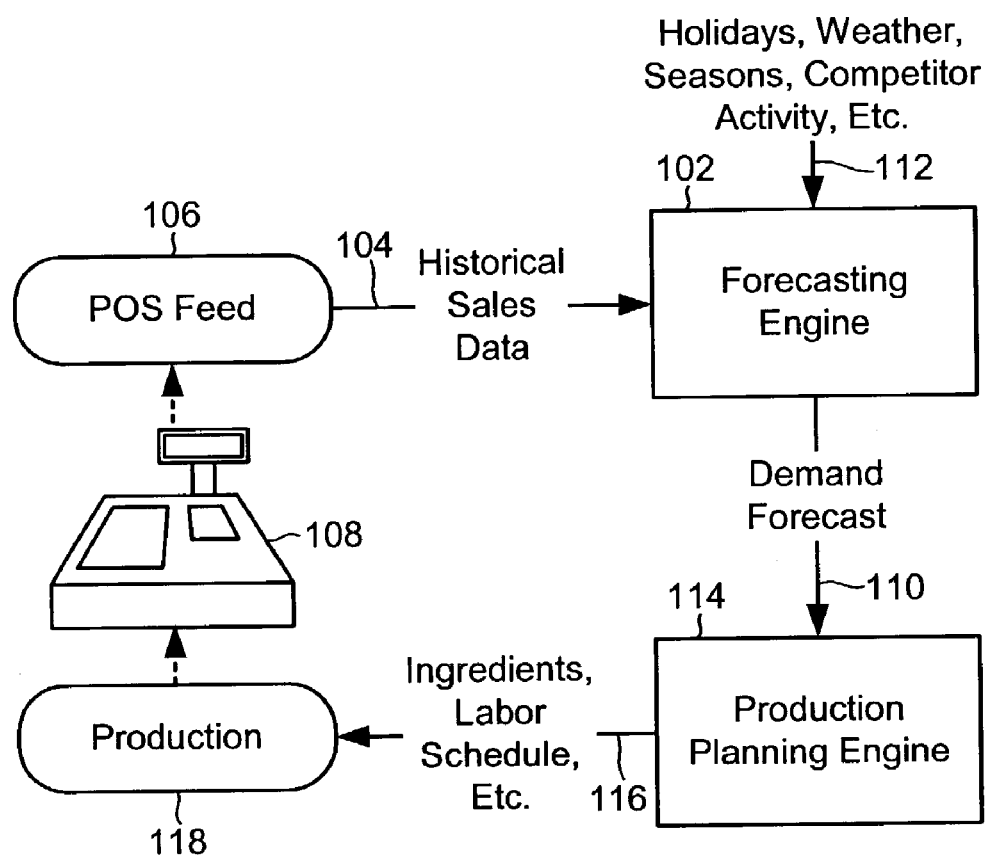
FIG. 1 is a block diagram of a conventional system for forecasting and production planning.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

In a conventional forecasting and production planning system 100, illustrated in FIG. 1, a forecasting engine 102 receives historical sales data 104 directly from a point-of-sale (POS) feed 106. The POS feed 106 may be implemented on a network server, which receives daily sales or transaction-level sales for one or more products from a number of POS devices 108 (e.g., cash registers). The POS feed 106 may be accessible, for example, through a local area network (LAN) or the Internet.

The forecasting engine 102 uses the historical sales data 104 to generate a forecast 110 of consumer demand for each product. The forecasting engine 102 may refine the forecast 110 using various external data 112, such as information regarding holidays, weather, seasons, competitor activity, etc.

A production planning engine 114 uses the forecast 110 to create a plan 116 for producing a sufficient quantity of each product to satisfy the forecasted demand. Depending on the industry, the production plan 116 may include, for example, a list of required ingredients, a labor schedule, etc.

A production facility 118, such as a bakery or deli, uses the production plan 116 to produce the forecasted quantities of products, which are then inventoried and sold in due course. A cash register or other POS device 108 records the daily number of sales of each product and periodically sends the sales quantities to the POS feed 106 for future access by the forecasting engine 102.

Figure 2:
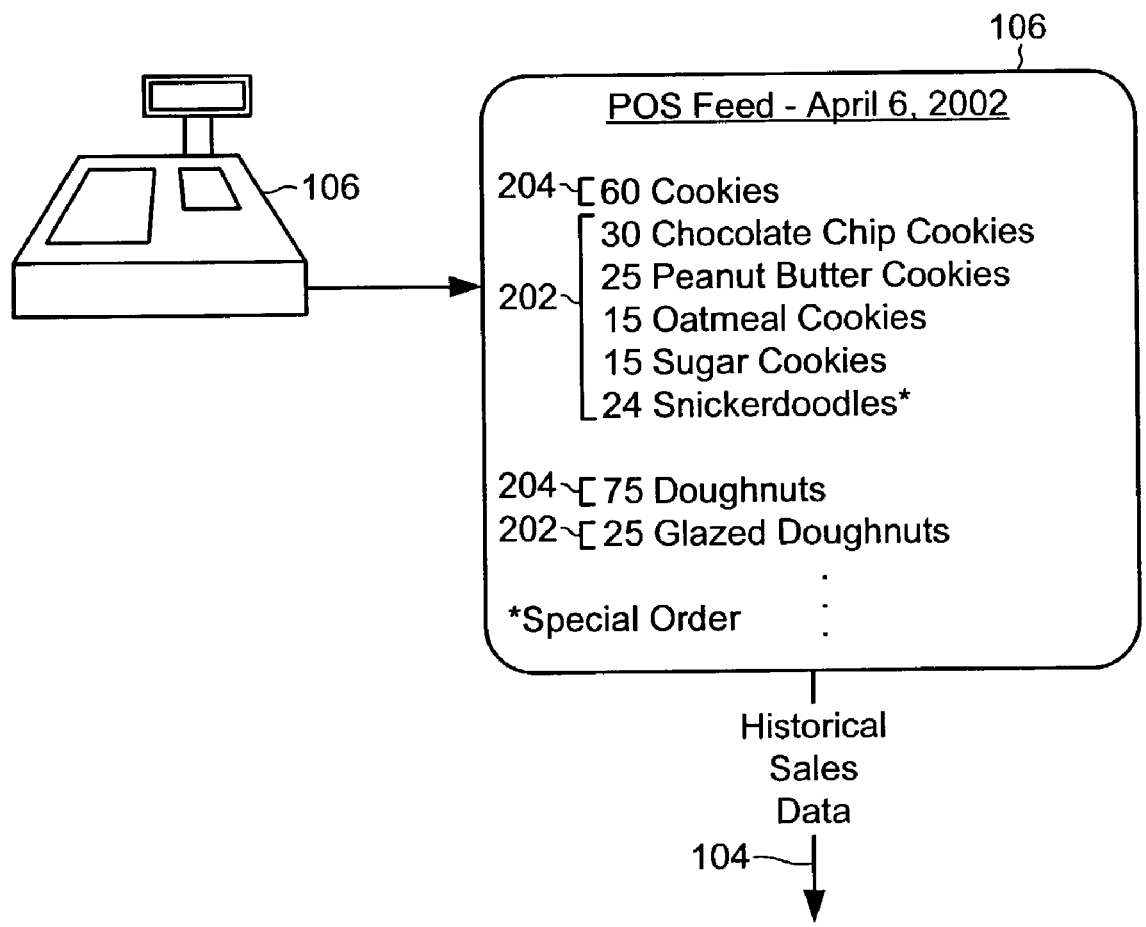
FIG. 2 is a block diagram of a point-of-sale (POS) feed.

Referring to FIG. 2, a typical POS feed 106 provides daily or transaction-level sales 202 for a number of "individual" items, i.e., items whose sale can be specifically recorded and for which a specific forecast of demand is needed. An example of an individual item is a chocolate chip cookie, since a POS device 106 may have a designated code or button for recording the sale, and a bakery needs to know how many chocolate chip cookies to produce each day. In some cases, an individual item may include a group of other individual items sold as a unit, e.g., a cookie tin, since a forecast 110 of the number of cookie tins to produce in a given day may be desirable.

The POS feed 106 may also provide daily or transaction-level sales 204 for one or more "miscellaneous group" items. Many POS devices 106 allow sales of individual items to be recorded under "miscellaneous" or "variety" designations. This can be helpful to a check-out clerk who does not know the specific code for an individual item. For example, a chocolate chip cookie may be rung up as a "cookie" or as a "miscellaneous bakery" item. This is also required when a group of items can only be sold using a single code. For example, varieties of bagels (blueberry bagel, onion bagel, plain bagel, etc.) may only be sold using a 'Bagel' code.

However, the existence of miscellaneous group items on a cash register is problematic to forecasting and production planning. Because sales of miscellaneous group items comprise undifferentiated sales of one or more of the individual items, the resulting historical sales data 104 are ambiguous. For example, as shown in FIG. 2, sixty cookies were rung up as a generic "cookie" item, as opposed to the particular variety of cookie, which represents almost two-thirds of the reported sales.

A conventional forecasting engine 102 might estimate the miscellaneous cookie sales attributable to the individual varieties based on the relative proportions of the individual item sales quantities 202. However, such an estimate can be very inaccurate. For example, suppose that, of the sixty generic cookie sales, fifty were oatmeal cookies. A forecast 110 based on a proportional allocation of the miscellaneous group item sales would be inaccurately weighted to the other varieties.

Figure 3:
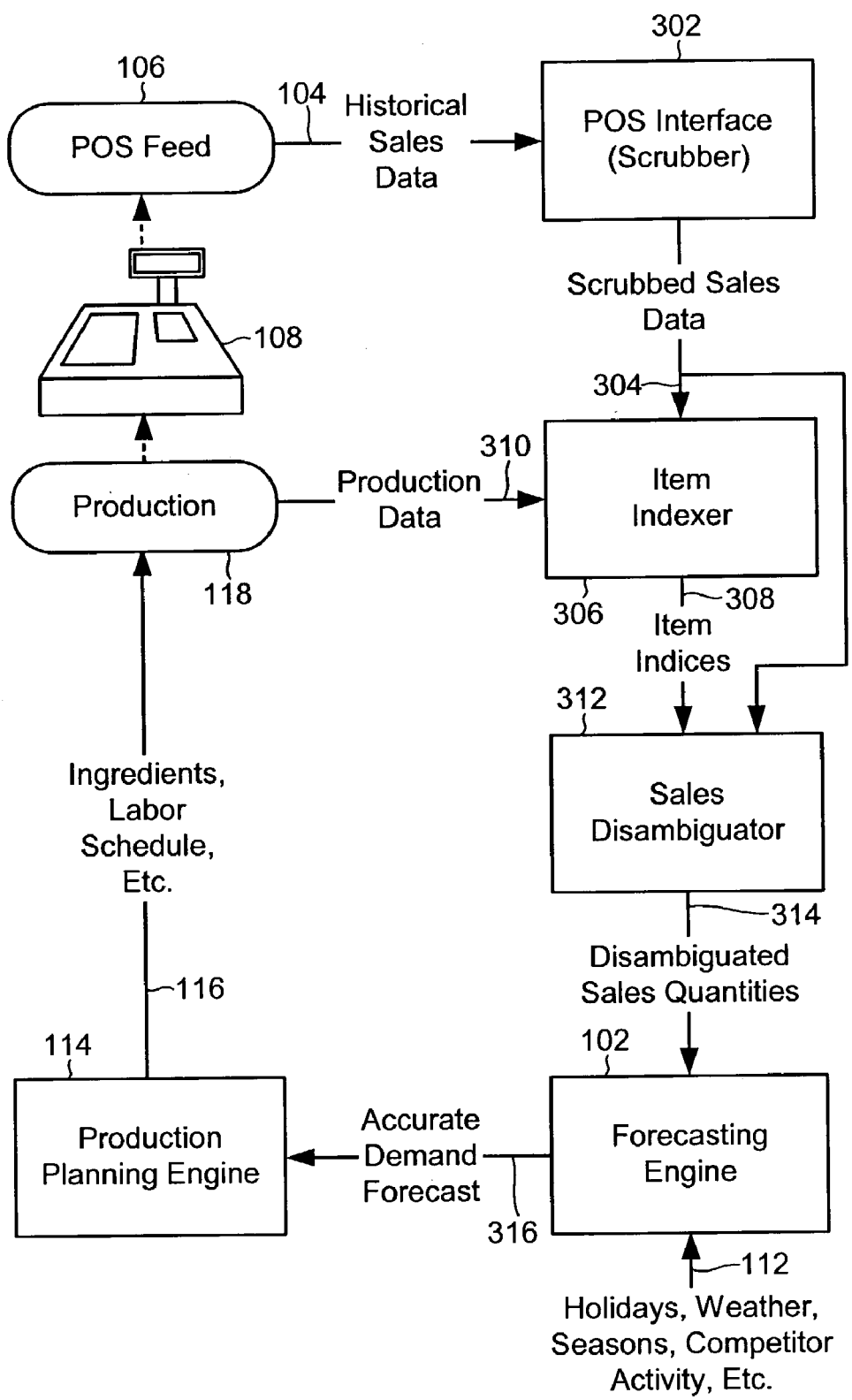
FIG. 3 is a block diagram of a forecasting and production planning system according to an embodiment of the invention.

FIG. 3 is a block diagram of a forecasting and production planning system 300 according to an embodiment of the invention that solves the aforementioned problems and disadvantages. A point-of-sale (POS) interface 302 receives the historical sales data 104 from the POS feed 106. The historical sales data 104 includes individual and miscellaneous group item sales quantities 202, 204 for the same particular time period, such as a day or a portion of a day.

As described below, the POS interface 302 may optionally include logic for scrubbing, removing, or otherwise blocking certain types of data. For example, special orders are likely to be one-time events. Hence, the POS interface 302 may automatically exclude sales quantities 202, 204 marked as special orders, generating scrubbed sales data 304.

An item indexer 306 receives the scrubbed sales data 304 and creates an item index 308 for each individual item. As explained in greater detail hereafter, an item index 308 is a fraction or percentage contribution of an individual item to the sales of an associated miscellaneous group item. In one embodiment, the item indexer 306 relies on production data 310 from the production facility 118 to create the indices 308.

A sales disambiguator 312 uses the item indices 308 and the scrubbed sales data 304 to generate disambiguated or revised sales quantities 314, representing the actual quantity of each product sold. The disambiguated sales quantities 314 may then be fed to the forecasting engine 102 to provide a more accurate forecast 316 of demand to the production planning engine 114.

Both the forecasting and production planning engines 102, 114 may be implemented using components of an available software package, such as Fresh Market Manager™ (FMM), sold by Park City Group, Inc., of Park City, Utah. However, the use of other forecasting and production planning systems are contemplated within the scope of the invention. Furthermore, any of the modules, engines, components, etc., described herein may be implemented using a suitable combination of hardware, software, and/or firmware known to those of ordinary skill in the art.

Figure 4:
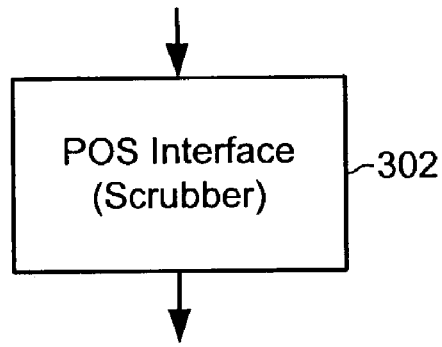
FIG. 4 is a block diagram of a POS interface.

FIG. 4 illustrates an optional data-scrubbing function of the POS interface 302. As noted, historical sales data 104 may include sales quantities 202, 204 for individual and miscellaneous group items. In one embodiment, certain sales quantities 202, 204 may be tagged or marked as a "special order," i.e., an order placed and/or fulfilled outside of the usual routine, possibly for customized products, that is not likely to recur with any degree of predictability. An example of a special order at a bakery may be three-dozen red sugar cookies to celebrate the Superbowl victory of Tampa Bay. Any suitable marking or tagging method may be used within the scope of the invention, such as an eXtensible Markup Language (XML) tag or the like.

Special orders are likely to be one-time events, which makes them of little value from a forecasting perspective. Accordingly, the POS interface 302 identifies sale quantities 202, 204 marked as special orders. The marked sales quantities 202, 204 are then scrubbed, removed, masked, or otherwise excluded by the POS interface 302. The resulting scrubbed sales data 304 may then be provided to the item indexer 306 and sales disambiguator 312 as described above.

Of course, the data-scrubbing function of the POS interface 302 may be configured in other ways and/or disabled by an operator. Moreover, in alternative embodiments, the item indexer 306 and/or the sales disambiguator 312 may perform the data-scrubbing function.

Figure 5:
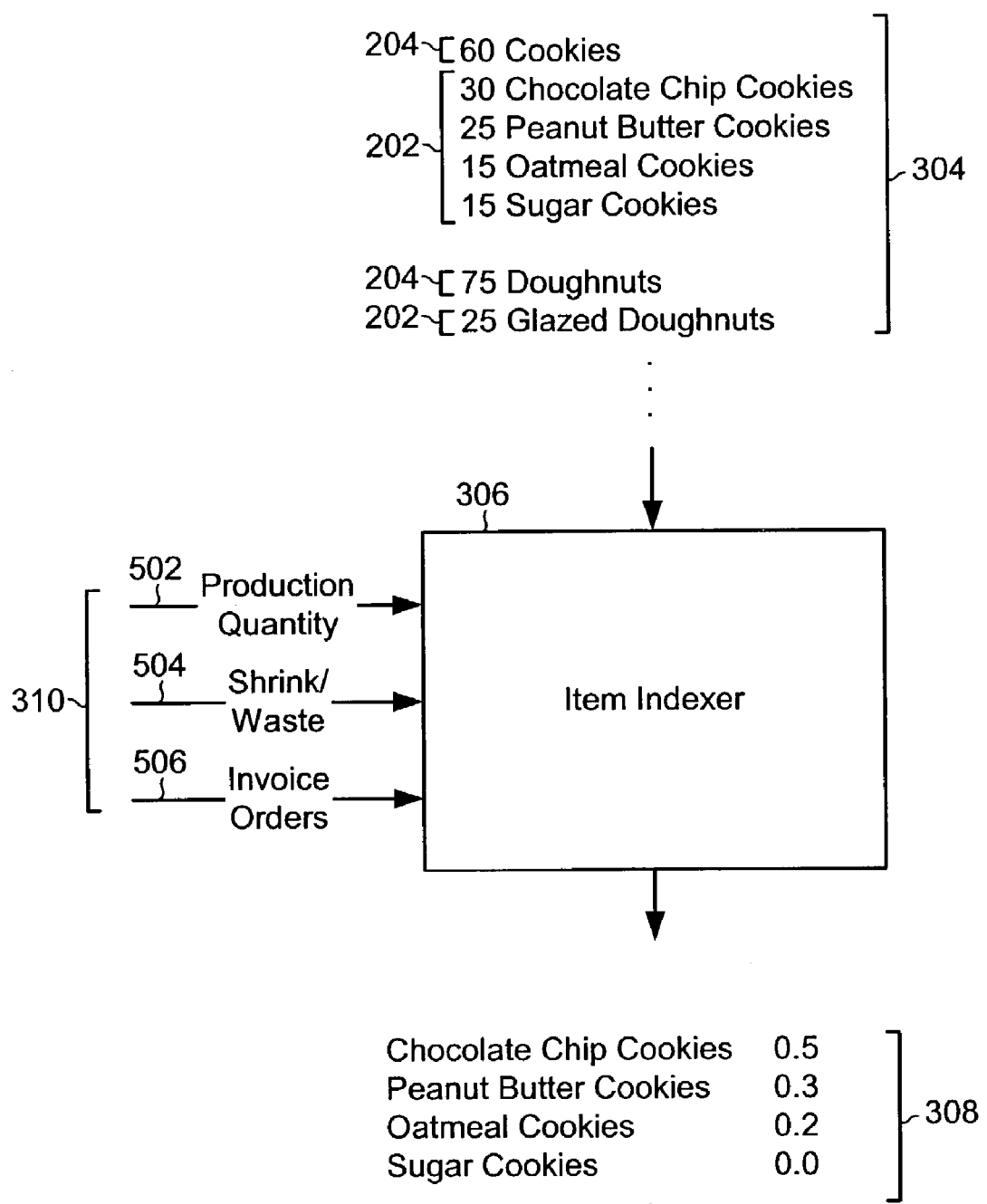
FIG. 5 is a block diagram of an item indexer.

FIG. 5 illustrates further details of item indexer 306. As noted above, the item indexer 306 receives the scrubbed sales data 304 and the production data 310. In one embodiment, the production data 310 includes, for each individual item, a production quantity 502, a shrink/waste quantity 504, and an invoice order quantity 506. The production quantity 502 is the quantity of each item produced, while the shrink/waste quantity 504 represents the quantity of each item that was discarded either prior to or after packaging.

The invoice order quantity 506 corresponds to the quantity of each item that was sold by an invoice order, as opposed to a retail, over-the-counter sale. An invoice order differs from a special order in that an invoice order typically occurs with predicable frequency. Moreover, an invoice order usually pertains to standard products, e.g., three-dozen blueberry bagels.

The item indexer 306 uses the production data 310, including the production quantities 502, shrink/waste quantities 504, and/or invoice order quantities 506, to generate an item index 308 for each individual item. In the depicted embodiment, an item index 308 is a number between zero and one, and represents fraction or percentage contribution of an individual item to the quantity sales 204 of an associated miscellaneous group item (e.g., "cookies").

One algorithm for calculating the item indices is 308 set forth in the following pseudocode. Those of skill in the art will recognize that the algorithm may be implemented using any conventional programming language, such as C++, Java, or the like.

For each Miscellaneous Group Item:
Sum=0
For Each Individual Item:
Misc. Net Quantity of Individual Item (MNQ)=Production Total−Shrink/Waste Total−Invoice Orders Total−Individual Item Sales Total
Sum=Sum+MNQ
End for (Individual Item)
For each Individual Item:
Index=MNQ/Sum
End for (Individual Item)
End for (Miscellaneous Group Item)

Figure 6:
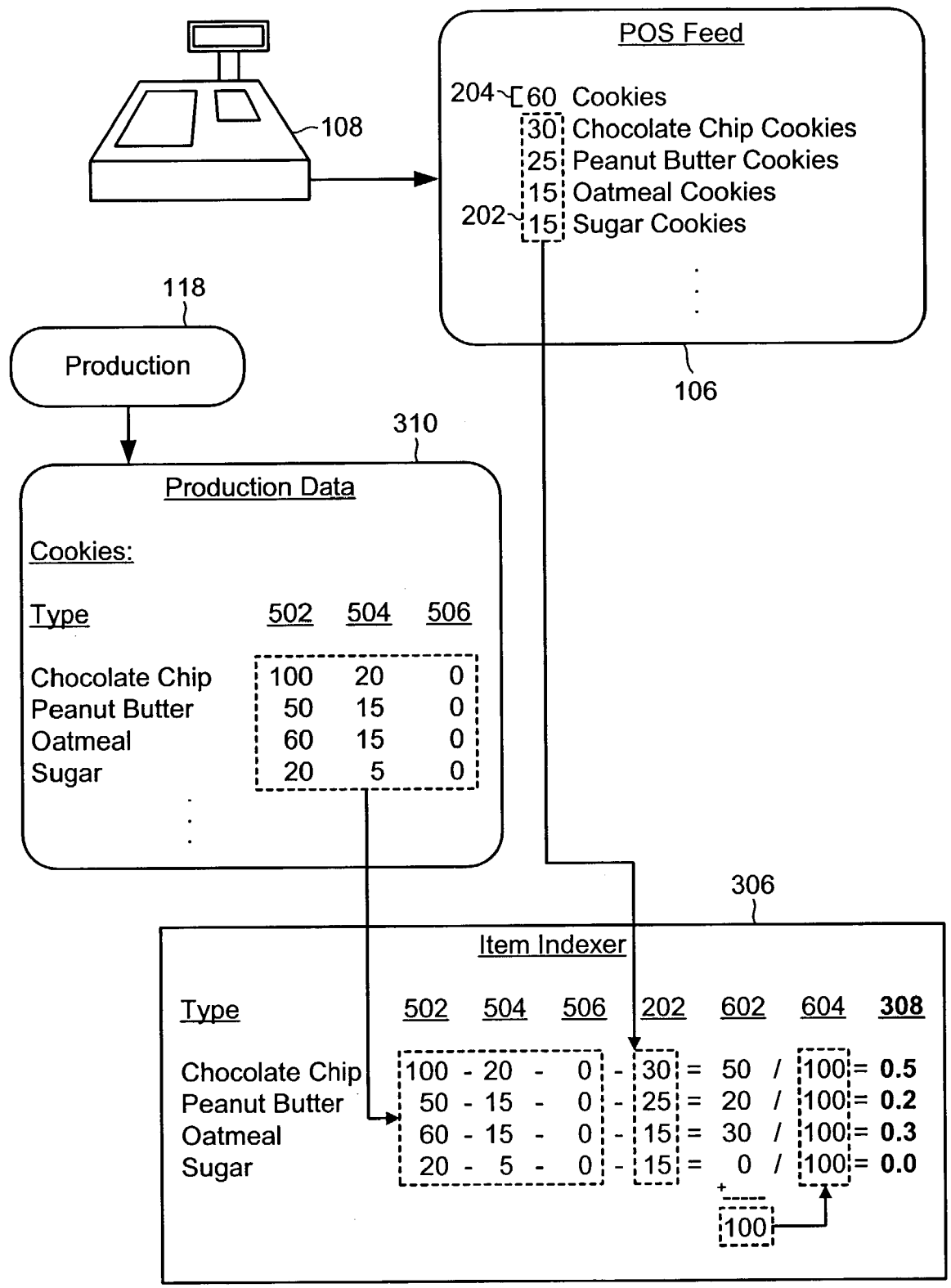
FIG. 6 is a dataflow diagram showing the creation of item indices.

FIG. 6 illustrates the above-identified algorithm in connection with sample data. For simplicity, only a single miscellaneous group item is used in this example. However, those of skill in the art will recognize that the techniques disclosed herein may be used for multiple miscellaneous group items.

Initially, the item indexer 306 subtracts the shrink/waste quantities 504, invoice order quantities 506, and individual item sales quantities 202 from the production quantities 502 for each individual item. The resulting figure is a "miscellaneous net quantity" (MNQ) 602 of each individual item that was not accounted for in the individual item sales quantities 202 or by non-point-of-sale transfers (e.g., invoice orders, shrink/waste).

While determining the MNQ 602 for each individual item, a running sum 604 of the MNQs for all of the individual items is made. The item index 308 for a particular individual item is then calculated by dividing the MNQ 602 for that item by the MNQ sum 604 for all of the individual items.

In the depicted example, 100 chocolate chip cookies were produced, of which 20 were discarded, none were sold by invoice order, and 30 were sold at the cash register. Hence, 50 chocolate chip cookies are not accounted for (the MNQ 602). The sum of the MNQs 602 for all cookie varieties is 100. Accordingly, the item index 308 for the chocolate chip cookies, as a percentage or fraction of the sales quantities 204 for the "cookies" miscellaneous group item is 0.5.

Figure 7:
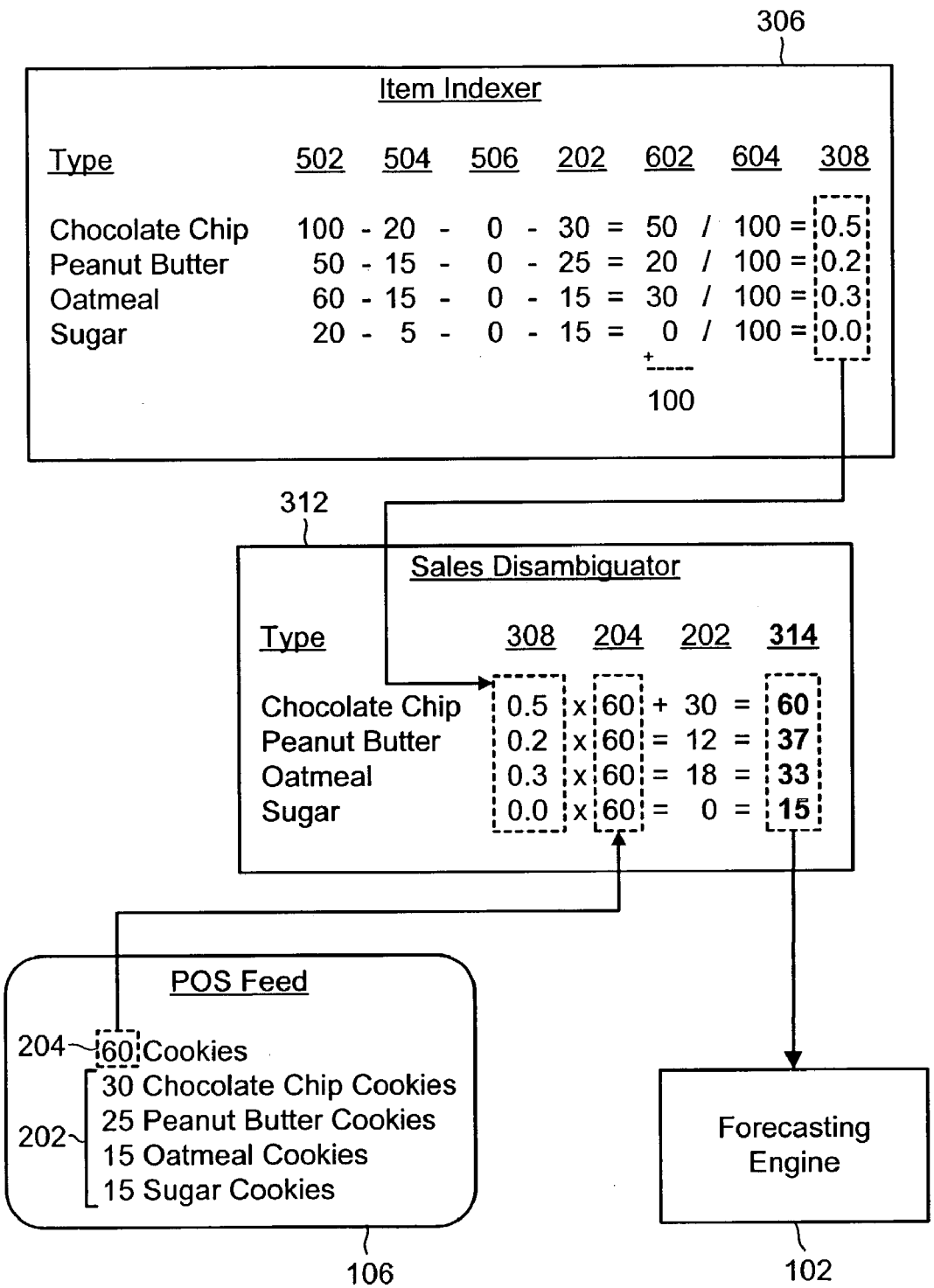
FIG. 7 is a dataflow diagram showing the creation of disambiguated sales quantities based on the item indices.

Referring to FIG. 7, the sales disambiguator 312 uses the item indices 308 to calculate disambiguated sales quantities 314 for each of the individual items. With respect to each individual item, the sales disambiguator 312 adds the sales quantity 202 for the individual item to a product of the item index 308 for the individual item and the sales quantity 204 for the associated miscellaneous group item. After all of the disambiguated sales quantities 314 are calculated, they are provided to the forecasting engine 102.

In the illustrated example, the item index 308 for chocolate chip cookies is 0.5. In addition, the sales quantity 204 for the "cookies" miscellaneous group item is 60, and the sales quantity 204 for chocolate chip cookies, as recorded at the point-of-sale, is 30. Based on these data, the disambiguated sales quantity 314 for chocolate chip cookies is 60.

FIG. 8 provides a comparison of the disambiguated sales quantities 314 of FIG. 7 with estimated sales quantities based on a proportionate allocation of the miscellaneous group item sales quantities 204 among the sales quantities 202 for the various individual items. As may be observed, the estimated sales quantity for oatmeal cookies is 27% higher than the actual, disambiguated sales quantity 314. Even more significant is the estimated sales quantity for sugar cookies, which is 42% less than the actual, disambiguated sales quantity 314.

In view of the foregoing, a forecast 110 based on the estimated sales quantities, as in conventional approaches, would be highly inaccurate, resulting in the production of too many of some varieties (e.g., peanut butter cookies and sugar cookies), while not producing enough of other varieties (e.g., chocolate chip cookies and oatmeal cookies).

Figure 9:
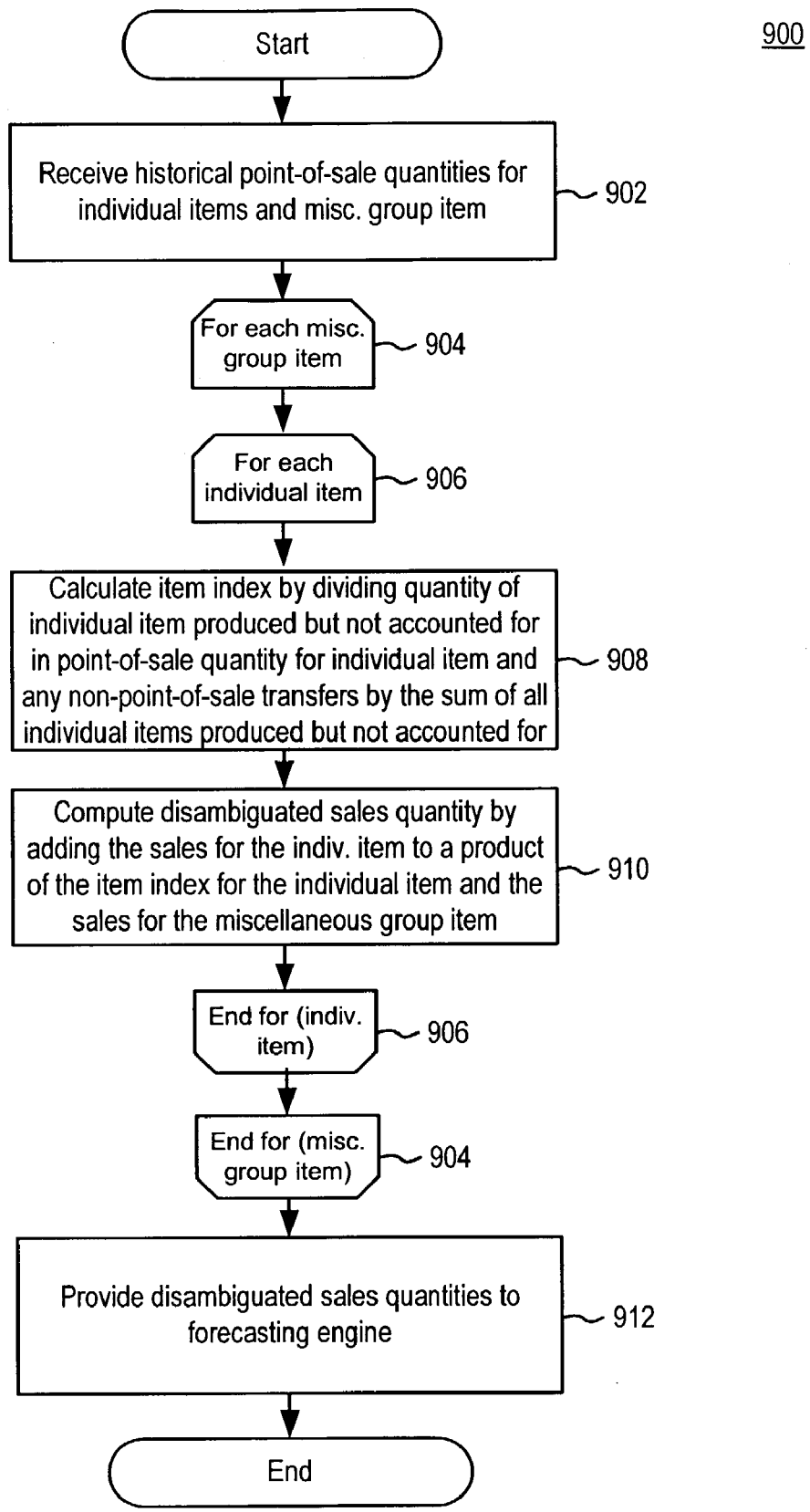
FIG. 9 is a flowchart of a method for disambiguating point-of-sale data to increase forecasting accuracy.

FIG. 9 is a flowchart of a method 900 for disambiguating point-of-sale data that summarizes techniques described above. For simplicity, as in FIGS. 6 and 7, only one miscellaneous group item is referenced, although the invention is not limited in this respect.

Initially, the system 300 receives 902 historical point-of-sale sales 202, 204 from the POS feed 106. Thereafter, for each miscellaneous group item 904, and then for each individual item 906, the system 300 calculates 908 an item index 308 for the individual item by dividing a quantity of the individual item produced but not accounted for in point-of-sale quantities for the individual item and any non-point-of-sale transfers (e.g., invoice orders, shrink/waste) by the sum of all individual items produced but not accounted for.

Next, the system 300 computes 910 a disambiguated sales quantity 314 for the individual item (representing a quantity sold) by adding the sales quantity 202 for the individual item to a product of the item index for the individual item and the sales quantity 204 for the miscellaneous group item. Once all of the disambiguated sales quantities 314 have been calculated, the system 300 provides 912 the disambiguated sales quantities 314 to the forecasting engine 102.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A method for disambiguating historical point-of-sale data to enhance forecasting accuracy, the method comprising:

receiving point-of-sale quantities for a plurality of individual items;

receiving a point-of-sale quantity for a miscellaneous group item, wherein the miscellaneous group item comprises a plurality of differing individual items in a group, and wherein the point-of-sale quantity includes undifferentiated sales of one or more of the individual items in the group;

calculating an item index for each individual item comprising a fraction of miscellaneous group item sales attributable to the individual item; and computing a revised point-of-sale quantity for each individual item using the item index and the point-of-sale quantities for the miscellaneous group item and the individual item; and forecasting future demand for at last one individual item based on the revised point-of-sale quantity for the at least one individual item.

2. The method of claim 1, further comprising providing the revised point-of-sale quantities to a forecasting system.

3. The method of claim 1, wherein calculating an item index comprises:

determining a quantity of the item indiviual produced but not accounted for in the point-of-sale quantity for the individual item and any non-point-of-sale transfers; and dividing the quantity of the individual item produced but not accounted for by a sum of all of the individual items produced but not accounted for in the point-of-sale quantities for the individual items and any non-point-of-sale transfers.

4. The method of claim 1, wherein computing a revised point-of-sale quantity comprises adding the original point-of-sale quantity for the individual item to a product of the item index for the individual item and the point-of-sale quantity for the miscellaneous group item.

5. The method of claim 3, wherein determining a quantity of the individual item produced but not accounted for comprises:

determining a production quantity for the individual item; and subtracting the point-of-sale quantity for the individual item from the production quantity.

6. The method of claim 5, wherein determining a quantity of the individual item produced but not accounted for further comprising:

determining a quantity of the individual item discarded after production; and subtracting the discarded quantity of the individual item from the production quantity.

7. The method of claim 5, wherein determining a quantity of the individual item produced but not accounted for further comprises:

determining a quantity of the individual item transferred through an invoice order; and subtracting the quantity transferred by the invoice order from the production quantity.

8. The method of claim 1, wherein receiving point-of-sale quantities for a plurality of individual items comprises excluding sales marked as special orders from the point-of-sale quantities.

9. The method of claim 1, wherein the sales quantities for the individual items and the miscellaneous group item relate to a same particular time period.

10. The method of claim 1, wherein at least one individual item comprises a group of other individual items sold as a unit.

11. A system for disambiguating historical point-of-sale data to enhance forecasting accuracy, the system comprising a computer-readable storage medium including:

a point-of-sale interface to receive point-of-sale quantities for a number of individual items and a point-of-sale quantity for a miscellaneous group item, wherein the miscellaneous group item comprises a plurality of differing individual items in a group, and wherein the point-of-sale quantity includes undifferentiated sales of one or more of the individual items in the group;

an item indexer to calculate an item index for each individual item comprising a fraction of the miscellaneous group item sales attributable to the individual item; and a sales disambiguator to compute a revised point-of-sale quantity for each individual item using the item index and the point-of-sale quantities for the miscellaneous group item and the individual item, wherein the revised point-of-sale quantity for at least one individual item is used to forecast future demand for the at least one individual item.

12. The system of claim 11, wherein the sales disambiguator is to provide the revised point-of-sale quantities to a forecasting system.

13. The system of claim 11, the item indexer is to calculate an item index by determining a quantity of the individual item produced but not accounted for in the point-of-sale quantities for the individual item and any non-point-of-sale transfers, and dividing the quantity of the individual item produced but not accounted for by a sum of all of the individual items produced but not accounted for in the point-of-sale quantities for the individual items and any non-point-of-sale transfers.

14. The system of claim 11, wherein the sales disambiguator is to compute a revised point-of-sale quantity by adding the original point-of-sale quantities for the individual item to a product of the item index for the individual item and the point-of-sale quantity for the miscellaneous group item.

15. The system of claim 13, wherein the item indexer is to determine a quantity of the individual item produced but not accounted for by determining a production quantity for the individual item and subtracting the point-of-sale quantity for the individual item from the production quantity.

16. The system of claim 15, wherein the item indexer is to determine a quantity of the individual item produced but not accounted for by determining a quantity of the individual item discarded after production and subtracting the discarded quantity of the individual item from the production quantity.

17. The system of claim 15, wherein the item indexer is to determine a quantity of the individual item produced but not accounted for by determining a quantity of the individual item transferred through an invoice order and subtracting the quantity transferred by the invoice order from the production quantity.

18. The system of claim 11, wherein the point-of-sale interface is to exclude sales marked as special orders from the point-of-sale quantities.

19. The system of claim 11, wherein the sales quantities for the individual items and the miscellaneous group item relate to a same particular time period.

20. The system of claim 11, wherein at least one individual item comprises a group of other individual items sold as a unit.

21. A computer program product for disambiguating historical point-of-sale data to enhance forecasting accuracy, the computer program product comprising a computer-readable medium comprising program logic that is executable by a computer including:

program logic for receiving point-of-sale quantities for a plurality of individual items;

program logic for, receiving a point-of-sale quantity for a miscellaneous group item, wherein the miscellaneous group item comprises a plurality of differing individual items in a group, and wherein the point-of-sale quantity includes undifferentiated sales of one or more of the individual items in the group;

program logic for calculating an item index for each individual item comprising a fraction of miscellaneous group item sales attributable to the individual item; and program logic for computing a revised point-of-sale quantity for each individual item using the item index and the point-of-sale quantities for the miscellaneous group item and the individual item, wherein the revised point-of-sale quantity for at least one individual item is used to forecast future demand for the at least one individual item.

22. The computer program product of claim 21, wherein the computer-readable medium further comprises program logic for providing the revised point-of-sale quantities to a forecasting system.

23. The computer program product of claim 21, wherein the program logic for calculating an item index comprises:

program logic for determining a quantity of the individual item produced but not accounted for in the point-of-sale quantity for the individual item and any non-point-of-sale transfers; and program logic for dividing the quantity of the individual item produced but not accounted for by a sum of all of the individual items produced but not accounted for in the point-of-sale quantities for the individual items and any non-point-of-sale transfers.

24. The computer program product of claim 21, wherein the program logic for computing a revised point-of-sale quantity comprises program logic for adding the original point-of-sale quantities for the individual item to a product of the item index for the individual item and the point-of-sale quantity for the miscellaneous group item.

25. The computer program product of claim 23, wherein the program logic for determining a quantity of the individual item produced but not accounted for comprises:

program logic for determining a production quantity for the individual item; and program logic for subtracting the point-of-sale quantity for the individual item from the production quantity.

26. The computer program product of claim 25, wherein the program logic for determining a quantity of the individual item produced but not accounted for further comprises:

program logic for determining a quantity of the individual item discarded after production; and program logic for subtracting the discarded quantity of the individual item from the production quantity.

27. The computer program product of claim 25, wherein the program logic for determining a quantity of the individual item produced but not accounted for further comprises:

program logic for determining a quantity of the individual item transferred through an invoice order; and program logic for subtracting the quantity transferred by the invoice order from the production quantity.

28. The computer program product of claim 21, wherein the program logic for receiving point-of-sale quantities for a number of individual items comprises program logic for excluding sales marked as special orders from the point-of-sale quantities.

29. The computer program product of claim 21, wherein the sales quantities for the individual items and the miscellaneous group item relate to a same particular time period.

30. The computer program product of claim 21, wherein at least one individual item comprises a group of other individual items sold as a unit.

31. A system for disambiguating historical point-of-sale data to enhance forecasting accuracy, the system comprising:

means for receiving point-of-sale quantities for a plurality of individual items;

means for receiving a point-of-sale quantity for a miscellaneous group item, wherein the miscellaneous group item comprises a plurality of differing individual items in a group, and wherein the point-of-sale quantity includes undifferentiated sales of one or more of the individual items in the group;

means for calculating an item index for each individual item comprising a fraction of miscellaneous group item sales attributable to the individual item;

means for computing a revised point-of-sale quantity for each individual item using the item index and the point-of-sale quantities for the miscellaneous group item and the individual item; and means for forecasting future demand for at least one individual item based on the revised point-of-sale quantity for the at least one individual item.

32. The system of claim 31, wherein the means for calculating an item index comprises:

means for determining a quantity of the individual item produced but not accounted for in the point-of-sale quantity for the individual item and any non-point-of-sale transfers; and means for dividing the quantity of the individual item produced but not accounted for by a sum of all of the individual items produced but not accounted for in the point-of-sale quantities for the individual items and any non-point-of sale transfers.

33. The system of claim 31, wherein the means for computing a revised point-of-sale quantity comprises means for adding the original point-of-sale quantities for the individual item to a product of the item index for the individual item and the point-of-sale quantity for the miscellaneous group item.

* * * * *